US010180529B2

(12) United States Patent
Ohno et al.

(10) Patent No.: US 10,180,529 B2
(45) Date of Patent: Jan. 15, 2019

(54) ILLUMINATION DEVICE AND LIGHT-GUIDING MEMBER

(71) Applicant: KABUSHIKI KAISHA TOSHIBA, Minato-ku (JP)

(72) Inventors: Hiroshi Ohno, Kanagawa-ken (JP); Yuichiro Yamamoto, Kanagawa-ken (JP); Mitsuaki Kato, Kanagawa-ken (JP); Tomonao Takamatsu, Kanagawa-ken (JP); Masataka Shiratsuchi, Kanagawa-ken (JP); Hiromichi Hayashihara, Saitama-ken (JP); Hideo Tamura, Kanagawa-ken (JP); Masahiko Yamamoto, Kanagawa-ken (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 34 days.

(21) Appl. No.: 14/206,062

(22) Filed: Mar. 12, 2014

(65) Prior Publication Data
US 2014/0293645 A1   Oct. 2, 2014

(30) Foreign Application Priority Data

Mar. 26, 2013 (JP) .................................. 2013-064622

(51) Int. Cl.
| F21V 8/00 | (2006.01) |
| F21K 9/20 | (2016.01) |
| F21Y 115/10 | (2016.01) |

(52) U.S. Cl.
CPC ........... *G02B 6/005* (2013.01); *G02B 6/0021* (2013.01); *G02B 6/0046* (2013.01); *F21K 9/20* (2016.08);
(Continued)

(58) Field of Classification Search
CPC .... F21V 21/10; F21V 21/104; F21V 2200/20; G02B 6/005; G02B 6/0011;
(Continued)

(56) References Cited

U.S. PATENT DOCUMENTS

| 2,347,665 A | 5/1944 | Christensen et al. |
| 5,502,623 A | 3/1996 | Brotz |

(Continued)

FOREIGN PATENT DOCUMENTS

| DE | 42 37 107 A1 | 5/1994 | |
| EP | 0846915 A1 * | 6/1998 | ............. F21S 6/002 |

(Continued)

OTHER PUBLICATIONS

Extended Search Report dated Jun. 30, 2014 in European patent Application No. 14159133.9.

*Primary Examiner* — Alexander Garlen
*Assistant Examiner* — Colin Cattanach
(74) *Attorney, Agent, or Firm* — Oblon, McClelland, Maier & Neustadt, L.L.P.

(57) ABSTRACT

In one embodiment, an illumination device includes a light-guiding unit having a light output surface which outputs light and a back surface facing the light output surface, wherein the light-guiding unit has a curved surface in a region of the back surface farther than a first position on the back surface that is away by a first distance from an axis passing the light output surface and the back surface, and a rough surface in a region of the light output surface farther than a second position on the light output surface that is away by a second distance from the axis in a same direction as a direction from the axis toward the first position, and where an intersection of the axis and the back surface is an origin point, and a direction of the axis from the back surface to the light output surface is positive, a normal line of the
(Continued)

curved surface intersects with the axis at the positive side of the axis, and an angle formed by a normal line vector at the second position in a direction toward the light output surface from the back surface of the light output surface and a vector in a direction from the curved surface to the second position is equal to or more than a critical angle.

20 Claims, 9 Drawing Sheets

(52) U.S. Cl.
CPC ....... *F21V 2200/20* (2015.01); *F21Y 2115/10* (2016.08); *G02B 6/0036* (2013.01); *G02B 6/0043* (2013.01); *G02B 6/0061* (2013.01); *G02B 6/0085* (2013.01)

(58) Field of Classification Search
CPC .. G02B 6/0021; G02B 6/0033; G02B 6/0035; G02B 6/0043; G02B 6/0085; G02B 6/0045–6/0048; G02B 6/0058; G02B 6/0061; F21K 9/30
USPC ............ 362/311.02, 404, 408, 576, 603, 628
See application file for complete search history.

(56) References Cited

U.S. PATENT DOCUMENTS

| | | | | |
|---|---|---|---|---|
| 5,550,676 | A * | 8/1996 | Ohe | G02B 6/0001 359/599 |
| 6,161,939 | A * | 12/2000 | Bansbach | F21S 8/061 362/223 |
| 7,025,482 | B2 * | 4/2006 | Yamashita | G02B 6/0018 362/348 |
| 7,255,464 | B2 * | 8/2007 | Rodriguez Barros | B60Q 1/2665 362/494 |
| 7,534,013 | B1 | 5/2009 | Simon et al. | |
| 7,806,540 | B2 * | 10/2010 | Yoneda | G01N 21/8806 362/23.01 |
| 8,721,152 | B2 * | 5/2014 | Coleman | F21S 8/04 362/249.02 |
| 8,864,360 | B2 * | 10/2014 | Parker | F21V 29/70 362/249.03 |
| 8,931,945 | B2 * | 1/2015 | Yamagami | F21S 8/06 362/602 |
| 9,075,175 | B2 * | 7/2015 | Tsai | G02B 6/0036 |
| 9,618,678 | B1 * | 4/2017 | Tickner | G02B 6/0021 |
| 2002/0181223 | A1 * | 12/2002 | Ryu | G02B 6/0036 362/619 |
| 2004/0076010 | A1 * | 4/2004 | Kuo | G02B 6/0021 362/332 |
| 2006/0083000 | A1 * | 4/2006 | Yoon | F21V 5/04 362/311.02 |
| 2008/0137335 | A1 | 6/2008 | Tsai et al. | |
| 2008/0205061 | A1 * | 8/2008 | Holder | B60Q 1/2611 362/257 |
| 2009/0147525 | A1 * | 6/2009 | Lai | F21V 31/04 362/297 |
| 2009/0219716 | A1 * | 9/2009 | Weaver | F21V 3/04 362/235 |
| 2009/0323356 | A1 | 12/2009 | Simon et al. | |
| 2011/0063855 | A1 * | 3/2011 | Vissenberg | G02B 6/0021 362/311.12 |
| 2012/0140436 | A1 * | 6/2012 | Yang | F21V 13/02 362/84 |
| 2012/0281432 | A1 * | 11/2012 | Parker | F21V 29/70 362/609 |
| 2013/0021818 | A1 * | 1/2013 | Baek | G02B 6/0011 362/602 |
| 2013/0021823 | A1 * | 1/2013 | Yamagami | F21S 8/06 362/613 |
| 2013/0208495 | A1 * | 8/2013 | Dau | F21V 7/0008 362/551 |
| 2014/0029305 | A1 * | 1/2014 | Ye | G02B 6/0046 362/619 |
| 2014/0212090 | A1 * | 7/2014 | Wilcox | G02B 6/262 385/27 |
| 2014/0307465 | A1 * | 10/2014 | Choi | G02F 1/133615 362/606 |
| 2015/0138829 | A1 * | 5/2015 | Jang | F21S 8/061 362/606 |

FOREIGN PATENT DOCUMENTS

| | | | | |
|---|---|---|---|---|
| EP | 2 559 932 A1 | | 2/2013 | |
| JP | 2011-222420 | | 11/2011 | |
| WO | WO 2013131167 A1 * | | 9/2013 | ............... F21K 9/52 |
| WO | WO 2014021456 A1 * | | 2/2014 | ............... F21S 8/061 |
| WO | WO 2014030504 A1 * | | 2/2014 | ............... F21S 8/061 |
| WO | WO 2014120245 A1 * | | 8/2014 | ............ F21V 7/0008 |

* cited by examiner

ILLUMINATION DEVICE AND LIGHT-GUIDING MEMBER

CROSS-REFERENCE TO RELATED APPLICATION

This application is based upon and claims the benefit of priority from the prior Japanese Patent Application No. 2013-064622, filed on Mar. 26, 2013, the entire contents of which are incorporated herein by reference.

FIELD

Embodiments described herein relate generally to an illumination device and a light-guiding member.

BACKGROUND

An illumination device installed in proximity to the eyes of people such as a pendant light is important in how it appears when it is turned off. For example, in order to avoid closed atmosphere in a room, it is desired to provide an illumination device which appears to be transparent when it is turned off. An example of such illumination device includes a device using a transparent light-guiding plate that guides light emitted by an LED light source and that diffuses the light with a scatter pattern to output the light to the outside through a light output surface. In this case, there is much component of light that is not diffused by the scatter pattern and that is guided to an end portion far from the LED light source.

Therefore, there is an illumination device that uses a member such as a reflection sheet that reflects, toward a light output surface, the light which has reached the end portion of a light-guiding body. However, it used to be impossible to efficiently output, through the light outputs surface, the light that has reached the end portion of the light-guiding plate without deteriorating the transparentness of the illumination device.

DETAILED DESCRIPTION

Hereinafter, embodiments for carrying out the invention will explained with reference to drawings.

(First Embodiment)

Figure 1:
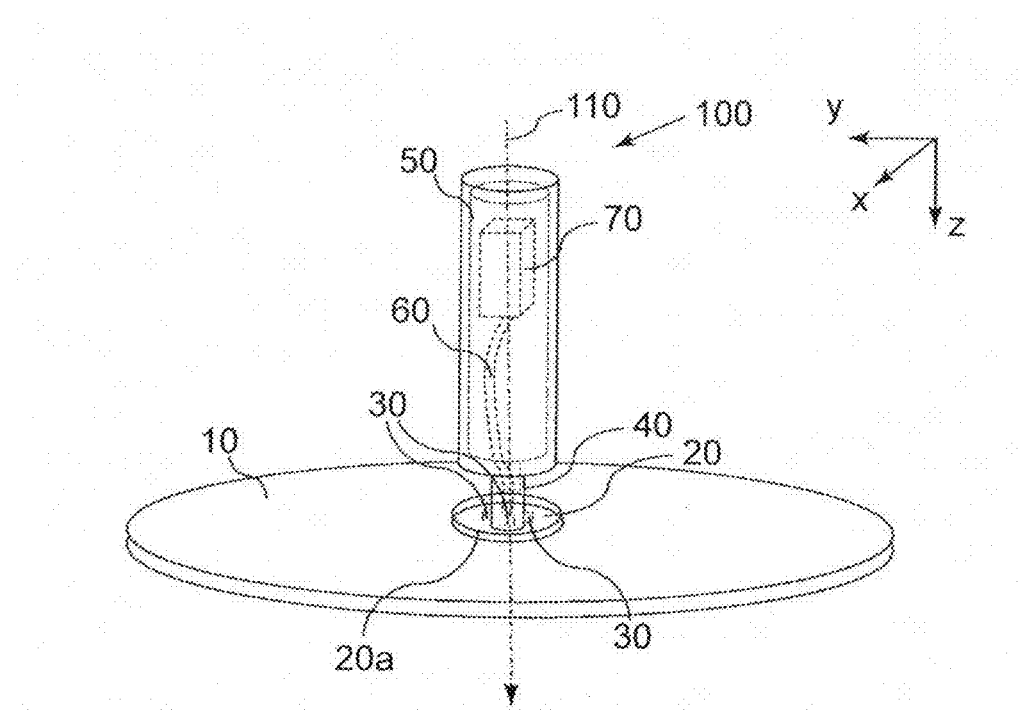
FIG. 1 is a perspective view illustrating an illumination device according to a first embodiment.
Figure 2:
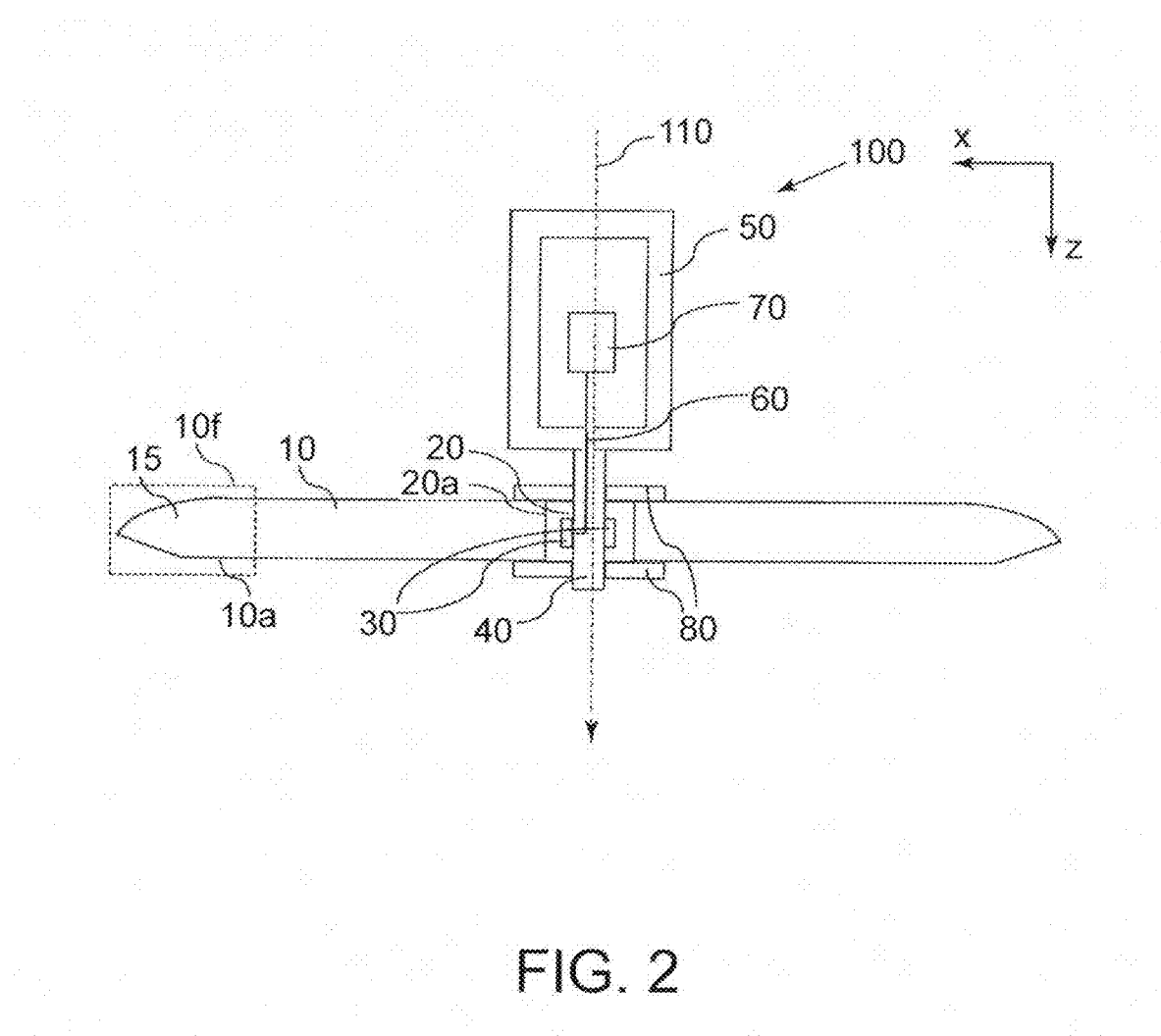
FIG. 2 is a cross sectional view illustrating an illumination device according to the first embodiment.

FIGS. 1 and 2 are figures illustrating an illumination device 100 according to the first embodiment. For example, the illumination device 100 is used as an indoor illumination, and is provided as being hung from a ceiling. FIG. 1 is a perspective view illustrating the illumination device 100. In this case, the gravity direction (direction from a ceiling to a floor surface) is denoted as z axis and the positive direction of a rotation symmetric axis 110. At this occasion, a plane perpendicular to the z axis is denoted as xy plane. It should be noted that a support unit 80 explained later is not illustrated in FIG. 1.

The illumination device 100 as illustrated in FIG. 1 includes multiple light sources 30 emitting light such as LEDs in the xy plane. Each light source 30 is provided so as to emit light in a different direction in proximity to the rotation symmetric axis 110. Each light source 30 is connected to a power supply 70 via an electric wire 60, and when electric power is supplied from the power supply 70, each light source 30 radially outputs visible light. The illumination device 100 is transparent to the visible light, and includes a thin disk-shaped light-guiding unit 10 provided along the xy plane. The light-guiding unit 10 has a hollow hole 20 in the center about the rotation symmetric axis 110.

A joint unit 40 is a column-shaped member passing through the hollow hole 20 of the light-guiding unit 10. The joint unit 40 is placed so that each light source 30 faces a side surface 20a of the hollow hole 20, and receives heat generated due to light emission of each light source 30 and transmits the heat to a heat radiation unit 50.

The heat radiation unit 50 is a member, having a high thermal conductivity, connected to the joint unit 40, and radiates the heat, which is received from the joint unit 40, to the outside of the illumination device 100 by way of its surface. The heat radiation unit 50 is connected to the ceiling, so that the illumination device 100 is hung from the ceiling. The heat radiation unit 50 has the power supply 70, which is provided therein.

FIG. 2 is a cross sectional view of the illumination device 100, and is a figure illustrating the illumination device 100 taken along the plane passing through the rotation symmetric axis 110 of FIG. 1.

As illustrated in FIG. 2, the illumination device 100 includes a pair of support units 80 provided to sandwich the light-guiding unit 10 in the z axis direction. Each of the support units 80 is joined with the joint unit 40, and fixes the light-guiding unit 10 with the joint unit 40 by sandwiching the light-guiding unit 10.

The light-guiding unit 10 guides, in the radial direction (the x axis direction in FIG. 2), the light which is incident from the side surface 20a of the hollow hole 20, and outputs the light to the outside (the positive direction in the z axis) through the light output surface 10a. At this occasion, the entire surface of the light output surface 10a outputs light, and therefore, the illumination device 100 can use this light as illumination light. The light-guiding unit 10 has a diffusing and transmitting unit 15 at an end portion 10f which is the farthest from the light source 30 in the radial direction. The diffusing and transmitting unit 15 outputs, through the light output surface 10a, the light having been guided and reached the end portion 10f.

For example, the light-guiding unit 10 is a transparent member which is made of acryl (refractive index n=1.49) and which is transparent to the visible light. For example, the thickness d of the light-guiding unit 10 is 5 mm. For example, the radius $r_{LG}$ of the light-guiding unit is 300 mm. The light-guiding unit 10 has the column-shaped hollow hole 20 about the rotation symmetric axis 110. For example, the radius $r_S$ of the hollow hole 20 is 11 mm. It should be noted that the material of the light-guiding unit 10 is not limited to acryl, and may be glass as long as it is transparent to the visible light. When the material of the light-guiding unit 10 is glass, the heat from the light source 30 is transmitted through the glass, and the heat is radiated from the surface of the glass, which is advantageous in terms of heat. The shape of the light-guiding unit 10 is not limited to the disk shape, and may be of any shape as long as it is a rotation symmetric shape such as a polygonal shape. In this case, the rotation symmetric is such a shape that returns back to its original shape within a rotation angle of less than 360 degrees when the light-guiding unit 10 is rotated with respect to the rotation symmetric axis 110. As described above, since the light-guiding unit 10 has a rotation symmetric shape, the light from the light source 30 is guided through the light-guiding unit 10 in a symmetrical manner about the rotation symmetric axis 110. Therefore, the luminance distribution within the light output surface 10a becomes almost uniform.

For example, the joint unit 40 is made of aluminum material. The joint unit 40 is, for example, a pillar which is rotation symmetric with respect to the rotation symmetric axis 110 and which has a diameter 21 mm. Multiple light sources 30 are placed on the side surface of the pillar. For example, the light emission surface of each light source 30 is 0.3 mm by 0.6 mm. One hundred light sources 30 are arranged with a regular interval in a ring shape manner so that the outward normal direction of the light emission surface is parallel to the outward normal direction of the pillar side surface. In this case, the light sources 30 may not be necessarily arranged in the ring-shaped manner. The light sources 30 may also be arranged in a polygonal shape. In a case where the light sources 30 are arranged in a polygonal shape, the stress imposed on the substrates of the light sources 30 can be reduced as compared with the ring-shaped manner. The joint unit 40 is hollow in the center, through which an electric wire 60 connecting the light source 30 and the power supply 70 is passed.

The joint unit 40 is partially provided with threading process. More specifically, the support unit 80 is configured to be a nut corresponding to the thread of the joint unit 40, so that the light-guiding unit 10 can be sandwiched in the z axis direction by the threads of the joint unit 40 and the two nuts.

For example, the heat radiation unit 50 is made of an aluminum material. However, the material is not limited thereto, and the heat radiation unit 50 may be made of a material having a higher thermal conductivity than the light-guiding unit 10 (for example, copper, transparent ceramics, glass and the like). For example, the heat radiation unit 50 is a pillar of which length is 400 mm, and is provided with radiation fins (not illustrated) in a plate shape on the surface thereof. At this occasion, the diameter of the outermost shell including the radiation fins is 40 mm. According to simplified calculation, this heat radiation unit 50 can reduce the increase of the temperature of the light source 30 to 100 degrees Celsius or less. The heat radiation unit 50 is hollow in the center, and in this hollow, a power supply circuit (not illustrated) including the power supply 70 is provided.

Figure 3:
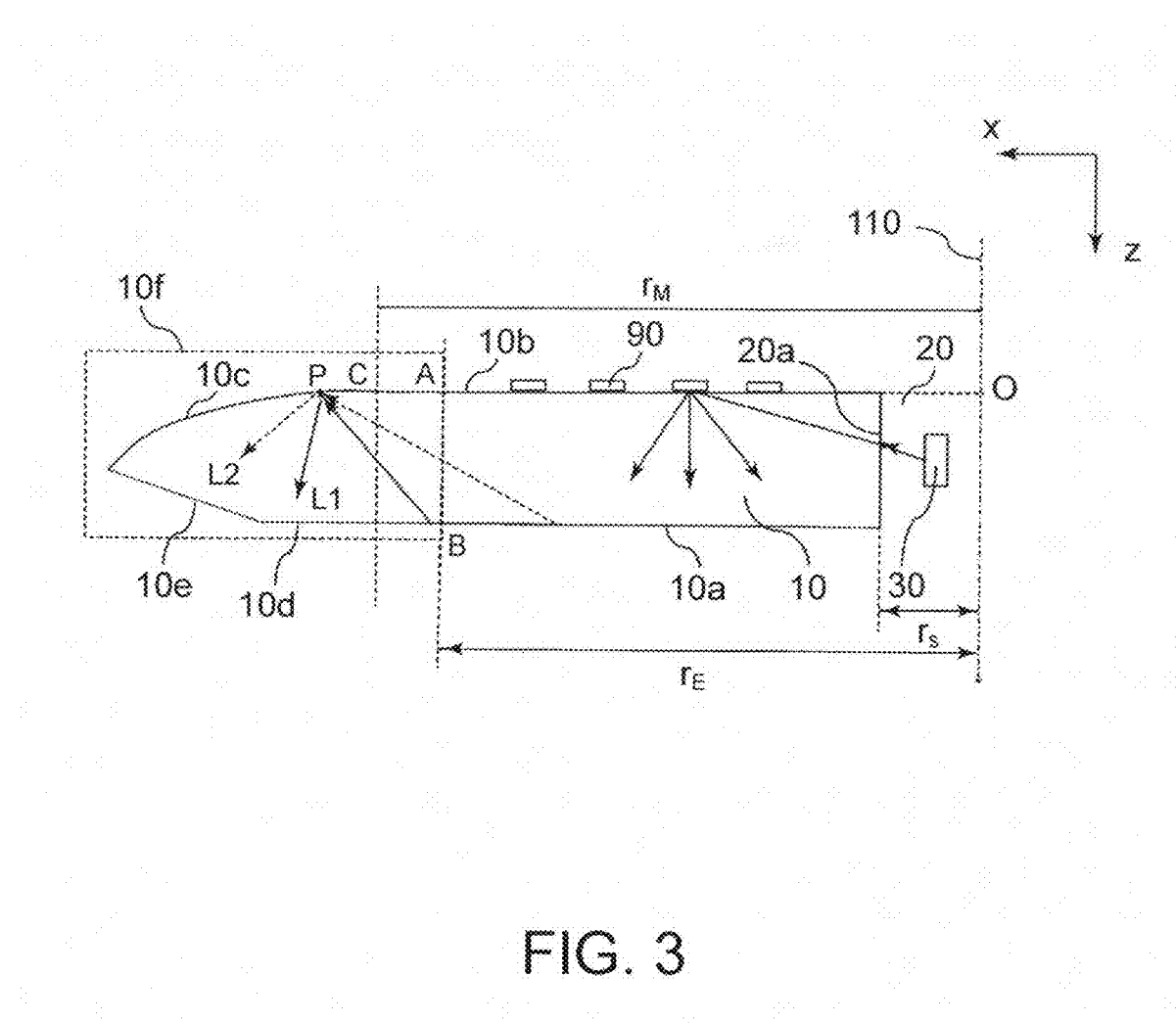
FIG. 3 is a partial view illustrating a light-guiding unit according to the first embodiment.

Hereinafter, the light-guiding unit 10 will be explained in detail. FIG. 3 is a partial view illustrating the light-guiding unit 10. In the explanation below, the intersection of the rotation symmetric axis 110 and the back surface 10b (or line interpolation of the back surface 10b) of the light-guiding unit 10 is defined as the origin point O of the rotation symmetric axis 110. Note that the surface 10b does not actually intersect the rotation symmetric axis 110, but the line interpolation of the back surface intersects the rotation symmetric axis 110. Hereafter, this case is also included as a definition of the intersection of the rotation symmetric axis 110 and the back surface 10b.

In this case, when the rotation symmetric axis 110 passes the hollow hole 20 of the back surface 10b, a point on the rotation symmetric axis 110 where the distance from a point on the line of intersection of the back surface 10b and the hollow hole 20 is the minimum is defined as the origin point O.

The light-guiding unit 10 has a curved surface 10c on the back surface 10b facing the light output surface 10a in a region which is at or farther than the distance $r_E$ from the rotation symmetric axis 110 in the x axis direction (first position A). The light-guiding unit 10 also has a rough surface 10d on the light output surface 10a in a region which is at or farther than the distance $r_E$ from the rotation symmetric axis 110 in the x axis direction (second position B). The light-guiding unit 10 also has an end surface 10e, connecting with the back surface 10b, on the light output surface 10a. In the present embodiment, a region which is at or farther than the distance $r_E$ from the rotation symmetric axis 110 in the x axis direction is the end portion 10f of the light-guiding unit 10. The curved surface 10c, the rough surface 10d, and the end surface 10e are collectively referred to as the diffusing and transmitting unit 15.

In this case, at a position where the distance from the rotation symmetric axis 110 in the x axis direction is $r_E$, the thickness of the light-guiding unit 10 is defined as $d_{LG}$. At this occasion, in a region where the distance from the rotation symmetric axis 110 of the back surface 10b of the light-guiding unit 10 in the x axis direction is equal to or more than $r_E$ (first position A) and equal to or less than $r_M = r_E + d_{LG} \cdot \tan \theta_c$ (third position C), the back surface 10b is parallel to the direction perpendicular to the rotation symmetric axis 110. It should be noted that $\theta_c$ is the critical angle of the light-guiding unit 10 (42 degrees in the present embodiment), and is expressed by the following expression using the refractive index n of the light-guiding unit 10.

$$\theta_c = \sin^{-1}\left(\frac{1}{n}\right) \quad \text{(Expression 1)}$$

In this case, the cross section of the light-guiding unit 10 is taken along the plane including the rotation symmetric axis 110. At this occasion, when any given point P on the back surface 10b is taken in the region where the distance from the rotation symmetric axis 110 in the x axis direction is equal to or more than $r_M$, the curved surface 10c is a surface where an extension line along an inward (direction toward the inside of the light-guiding unit 10) normal line direction at the point P and the rotation symmetric axis 110 intersect each other at the positive side of the rotation symmetric axis 110. Further, an angle formed by the outward normal (the direction toward the outside of the light-guiding unit 10, i.e., the direction toward the light output surface 10a from the back surface 10b) vector of the light output surface 10a at the point B and the vector PB connecting the point P and the second position B is equal to or more than the critical angle $\theta_c$. In the present embodiment, the outward normal line of the light output surface 10a at the point B (direction toward the outside of the light-guiding unit 10) matches the inward normal line vector of the back surface 10b at the point A.

In this case, more specifically, the curved surface 10c can be a shape satisfying the following expression. More specifically, for example, when the point B is defined as the origin point, the direction which is perpendicular to the rotation symmetric axis 110 and which is away from the light source 30 is denoted as R' direction, and the negative direction of the rotation symmetric axis 110 is denoted as z' (note that z' direction is opposite to z direction), and θ is a parameter. In this case, the curved surface 10c can be a finite interval satisfying the following expressions.

$$z' = d_{LG}\exp(\tan\theta_C(\theta - \theta_C))\frac{\cos\theta}{\cos\theta_C}$$ (Expression 2)

$$R' = d_{LG}\exp(\tan\theta_C(\theta - \theta_C))\frac{\sin\theta}{\cos\theta_C}$$ (Expression 3)

$$\left(\theta_C \le \theta < \frac{\pi}{2}\right)$$ (Expression 4)

For example, the rough surface 10d is formed by sandblasting, i.e., propelling particles of sizes from 1 um to 100 um onto the light output surface 10a. Alternatively, the rough surface 10d is formed by applying scatter particles thereon. The rough surface 10d can be white painted surface. In this case, the surface is made to be rough by the white paint.

The end surface 10e is a surface where the extension line along the inward normal line direction and the rotation symmetric axis 110 intersect each other at the negative side of the rotation symmetric axis 110. Like the rough surface 10d, the end surface 10e may be made by sandblasting or applying scatter particles.

In FIG. 3, a light beam L1 is totally reflected with the critical angle at the point B of the light output surface 10a of the light-guiding unit 10. At this occasion, the angle formed by the inward normal line vector of the light output surface 10a at the point B (direction toward the inside of the light-guiding unit 10) and the direction of the light beam L1 immediately after the total reflection is $\theta_c$. Further, the light beam L1 is totally reflected by the curved surface 10c in the region where the distance from the rotation symmetric axis 110 is equal to or more than $r_M$. The angle formed by the direction of the light beam L1 immediately after the total reflection and the inward normal direction of the curved surface 10c is equal to or more than the critical angle. This is because the shape of the curved surface 10c is defined by the equations from 2 to 4. On the other side, the angle formed by the direction of the light beam L1 immediately after the total reflection and the positive direction of the rotation symmetric axis 110 is equal to or less than the critical angle. Therefore, the light beam L1 further comes into contact with the light output surface 10a of the light-guiding unit 10 (in such a manner that the normal line direction is in parallel to the rotation symmetric axis 110), and the light beam L1 is transmitted to the outside without being totally reflected.

At a point closer to the LED with respect to the point B of the light output surface 10a, a light beam L2 is totally reflected with an angle larger than the critical angle, and is cast upon the back surface 10b at the same point as the light beam L1. At this occasion, the light beam L2 is cast upon the back surface 10b with an angle larger than the light beam L1 (an angle larger than the critical angle), and is therefore totally reflected.

As described above, the light propagating from the rotation symmetric axis 110 to the back surface 10b in the region at or farther than the distance $r_E$, and is totally reflected to proceed to the light output surface 10a.

On the other hand, a part of the light totally reflected by the region at or farther than the distance $r_E$ from the rotation symmetric axis 110 of the back surface 10b is cast upon the end surface 10e or the rough surface 10d, and is diffused and transmitted.

Figure 4:
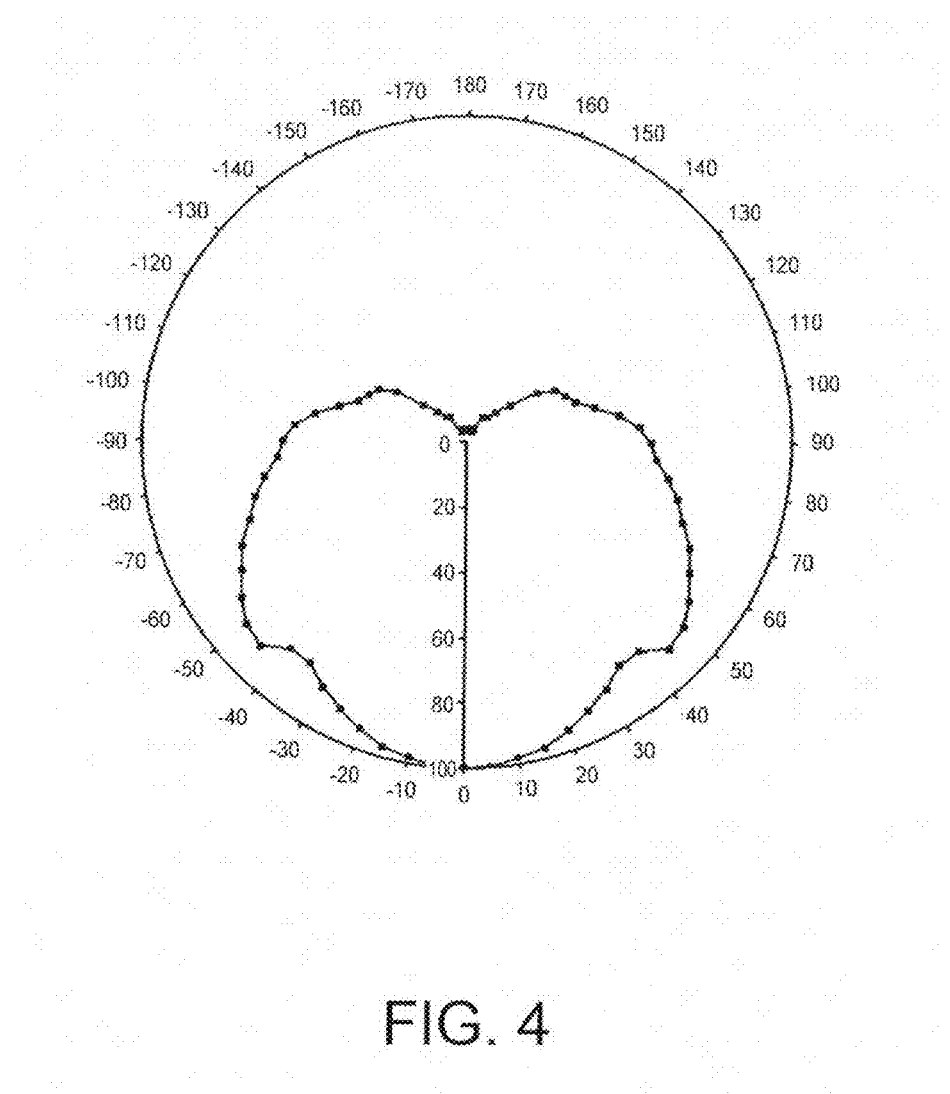
FIG. 4 is an example of a numeric calculation result according to the first embodiment.

As a result of the above process, the component of the light propagating to the positive direction of the rotation symmetric axis 110 is more than the component propagating to the negative direction. When the optical distribution without the scatter pattern is actually calculated by ray tracing simulation, the optical distribution without the scatter pattern is as illustrated in FIG. 4. In FIG. 4, the relative value of the luminous intensity (the maximum value is 100) is plotted with respect to the optical distribution angle. When there is no scatter pattern, the light emitted from the LED is substantially output from the diffusing and transmitting unit 15. From this figure, it is understood that, the light which is output from the light output surface 10a increases. More specifically, it is understood that the light reaching the end portion 10f of the light-guiding unit 10 can be output efficiently from the light output surface 10a. In addition, at this occasion, the light is guided by means of only the total reflection, and there are no other members such as a metal object provided to reflect the light. Therefore, the transparency of the illumination device 100 is not spoiled.

Figure 5:
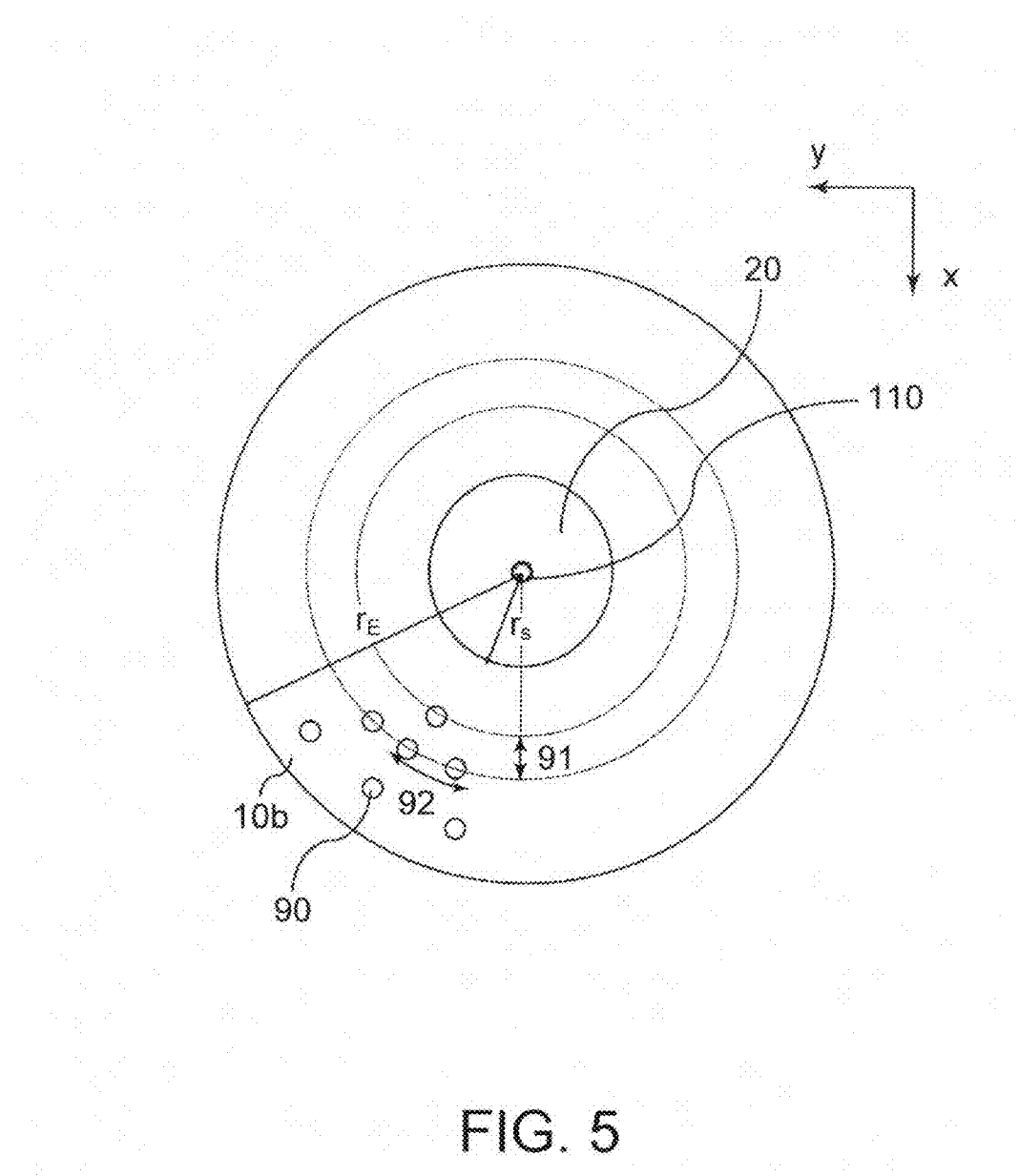
FIG. 5 is a figure illustrating a back surface of the light-guiding unit according to the first embodiment.

The light-guiding unit 10 has scatter dots 90 on the back surface 10b in order to scatter the guided light. For example, the scatter dots 90 are printing in white. FIG. 5 is a figure illustrating the back surface 10b of the light-guiding unit 10. The light-guiding unit 10 has the scatter dots 90 in a region which is at or farther than the radius $r_S$ (=11 mm) but within $r_E$ (=300 mm) on the back surface 10b. Although we assumed that the region of the scatter dots 90 starts from the edge of the hollow hole 20, the region of the scatter dots 90 can start from anywhere on the back surface 10b.

The distribution of the scatter dots 90 (scatter pattern) is described using two independent parameters, e.g., the pitch 91 in the radial direction and the pitch 92 in the azimuth direction. More specifically, a set of scatter dots 90 which are at the same distance from the rotation symmetric axis 110 is defined as the same row. The farther the row is away from the center, the larger the row number i is. The difference between the radial coordinate in the (i−1)-th row and the i-th row is called $L^i$, and this is defined as the pitch 91 in the radial direction. At this occasion, the radial coordinate r of the scatter dot 90 in the i-th row is given by the following expression.

$$r = r_S + \Sigma_{ii=0}^{i} L^{ii}$$ (Expression 5)

However, $L^0$ is 0. In this case, where the pitch $L^i$ in the radial direction is L which is constant, (Expression 5) is the following expression.

$$r = r_S + iL$$ (Expression 6)

The distance of the scatter dots 90 adjacent to each other in the azimuth direction in the same row is defined as the pitch 92 in the azimuth direction, and is denoted as $P_2$. $P_2$ is expressed by the following expression using C which is a constant.

$$P_2(r) = P_2(r_S) \frac{r_S}{C} \frac{C + (r_S^2 - r^2)}{r} \quad \text{(Expression 7)}$$

In this case, the diameter of the scatter dots 90 is denoted as D. At this occasion, in order to prevent the scatter dots 90 from overlapping each other, $P_2$ needs to be more than the diameter D of the scatter dots 90. Therefore, where $P_2$ is equal to or more than D when $r=r_E$ holds at which $P_2$ is the minimum, the following expressions need to be satisfied at the same time.

$$P_2(r_S) \geq D \frac{r_E}{r_S} \quad \text{(Expression 8)}$$

and $$C \geq \frac{r_S P_2(r_S)}{r_S P_2(r_S) - r_E D}(r_E^2 - r_S^2) \quad \text{(Expression 9)}$$

The maximum of $P_2(r_S)$ is $2\pi r_S$, and therefore, the following expression needs to be further satisfied.

$$P_2(r_S) \leq 2\pi r_S \quad \text{(Expression 10)}$$

It should be noted that the pitch 92 in the azimuth direction cannot be necessarily equal in the same row. More specifically, there may exist one combination of scatter dots 90 adjacent to each other where the closest distance of the scatter dots 90 in the same row is equal to or less than the pitch defined by the (Expression 7).

The distribution of the scatter dots 90 explained above is rarefactional when the scatter dots 90 are closer to the rotation symmetric axis 110, and it is condensational when the scatter dots 90 are farther from the rotation symmetric axis 110. Therefore, uniform luminous emittance can be achieved over the entire surface of the light output surface 10a of the light-guiding unit 10.

The light from the light source 30 is guided (propagated) from the center of the light-guiding unit 10 in a substantially radial manner. The light-guiding unit 10 has a cylindrical section in which the distance from the rotation symmetric axis 110 is r [mm]. In this section, the normal line direction matches the radial direction. The thickness of the section is d [mm]. The illuminance of the light incident upon the section per unit size [lm/mm$^2$] is F(r). Then, the total luminous flux I [lm] passing through the section is expressed by the following expression.

$$I = 2\pi r d F(r) \quad \text{(Expression 11)}$$

The total radiant flux I is attenuated by the scatter dots 90 in accordance with the component of the light which is output to the outside of the light-guiding unit 10. At this occasion, where the attenuation coefficient is denoted as k [1/mm], the following expression is satisfied.

$$\frac{dI}{dr} = -\kappa I \quad \text{(Expression 12)}$$

In this case, the amount of the attenuated radiant flux I is considered to have been substantially output from the light output surface 10a. In order to achieve uniform luminous emittance over the entire surface of the light output surface 10a which is emitted from the light output surface 10a of the light-guiding unit 10, the following expression needs to be satisfied where the luminous emittance is $L_0$ [lm/mm$^2$].

$$L_0 = \frac{\kappa I}{2\pi r} = \text{const.} \quad \text{(Expression 13)}$$

When the attenuation coefficient k is derived using the Expression 11) to the (Expression 13) explained above, the attenuation coefficient k is expressed by the following expression.

$$\kappa = \frac{2r}{\frac{I_0}{\pi L_0} + (r_S^2 - r^2)} \quad \text{(Expression 14)}$$

In this case, when a coverage factor ρ is defined as the size of area occupied by the scatter dots 90 per unit size of area, the attenuation coefficient k is considered to be proportional to the coverage factor ρ. For this reason, the coverage factor ρ is expressed by the following expression based on (Expression 14).

$$\rho(r) = \rho(r_S) \frac{C}{2r_S} \frac{2r}{C + (r_S^2 - r^2)} \quad \text{(Expression 15)}$$

$$C = \frac{I_0}{\pi L_0} \quad \text{(Expression 16)}$$

At this occasion, the coverage factor ρ is a monotonically increasing function with respect to r. On the other hand, ρ needs to be a positive real number. Therefore, the following expression is obtained based on the (Expression 15).

$$C \geq r_E^2 - r_S^2 \quad \text{(Expression 17)}$$

Since ρ is less than 1, the following expressions need to be satisfied at the same time on the basis of the (Expression 15) and the (Expression 17).

$$C \geq \frac{r_S}{r_S - r_E \rho(r_S)}(r_E^2 - r_S^2) \quad \text{(Expression 18)}$$

and $$\rho(r_S) \leq \frac{r_S}{r_E} \quad \text{(Expression 19)}$$

When the (Expression 15) is expanded by Taylor expansion, it can also be expressed as the following expression.

$$\rho(r) = \rho(r_S) \frac{C}{C + r_S^2} \frac{r}{r_S} \left(1 + \sum_{i=1}^{\infty} \left(\frac{r^2}{C + r_S^2}\right)^i\right) \quad \text{(Expression 20)}$$

In this case, while the pitch 91 in the radial direction and the diameter D of the scatter dots 90 are constant, the (Expression 7) is obtained by giving the following expression to the (Expression 15).

$$\rho \cong \frac{\pi D^2}{4P_1 P_2} \quad \text{(Expression 21)}$$

Figure 6:
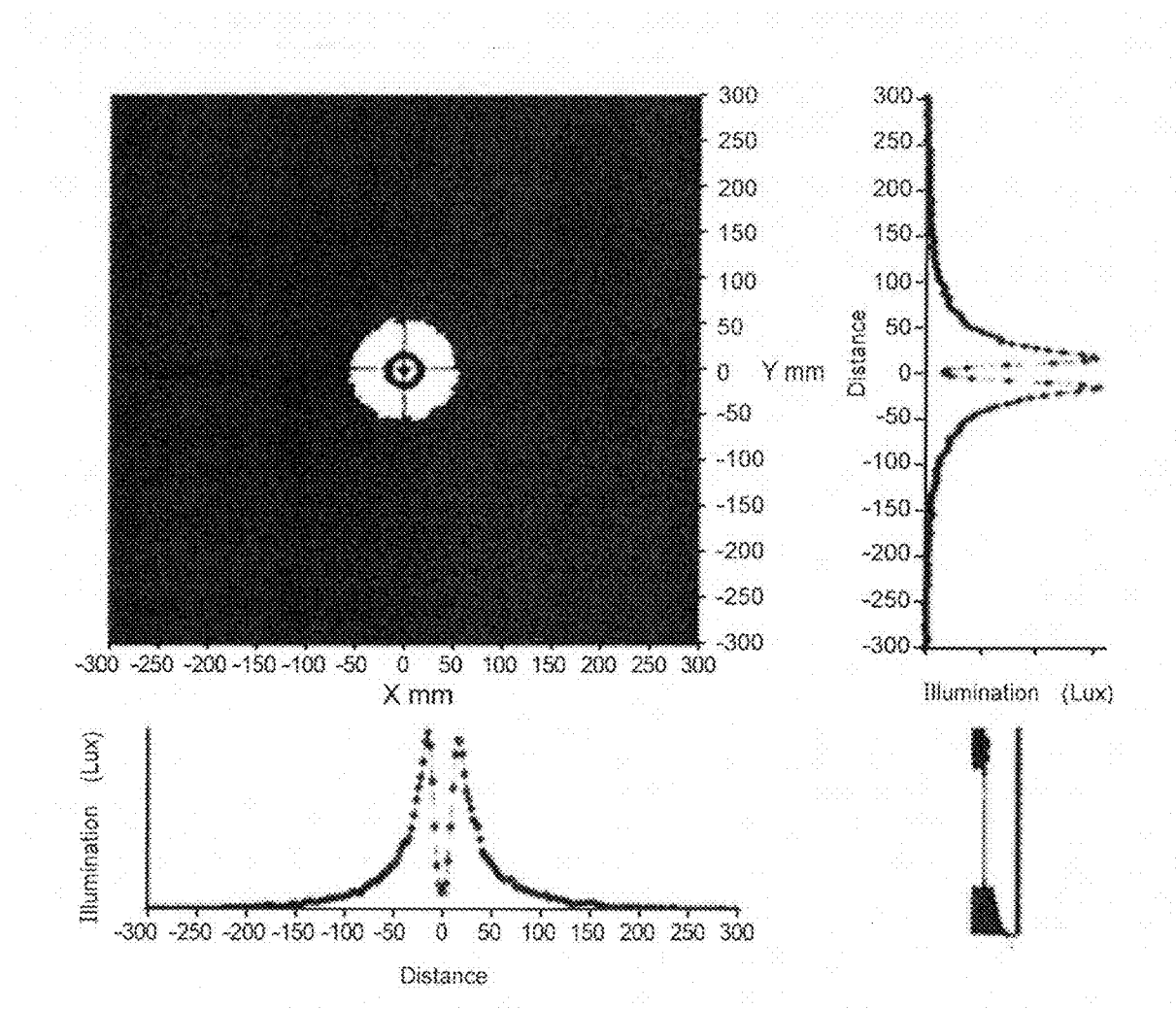
FIG. 6 is an example of a numeric calculation result according to the first embodiment.

When the scatter pattern is actually uniformly formed on the back surface 10b of the light-guiding unit 10, the illuminance distribution immediately under the light output surface 10a of the light-guiding unit 10 is as illustrated in FIG. 6. This figure is calculated by ray tracing simulation. In FIG. 6, a color contour of illuminance distribution is illustrated at the upper left. The horizontal axis is x axis [mm], and the vertical axis is y axis [mm]. These axes are perpendicular to the rotation symmetric axis 110. In this case, the ratio of the maximum value and the minimum value of the illuminance distribution (hereinafter referred to as maximum/minimum) is about 37.

Figure 7:
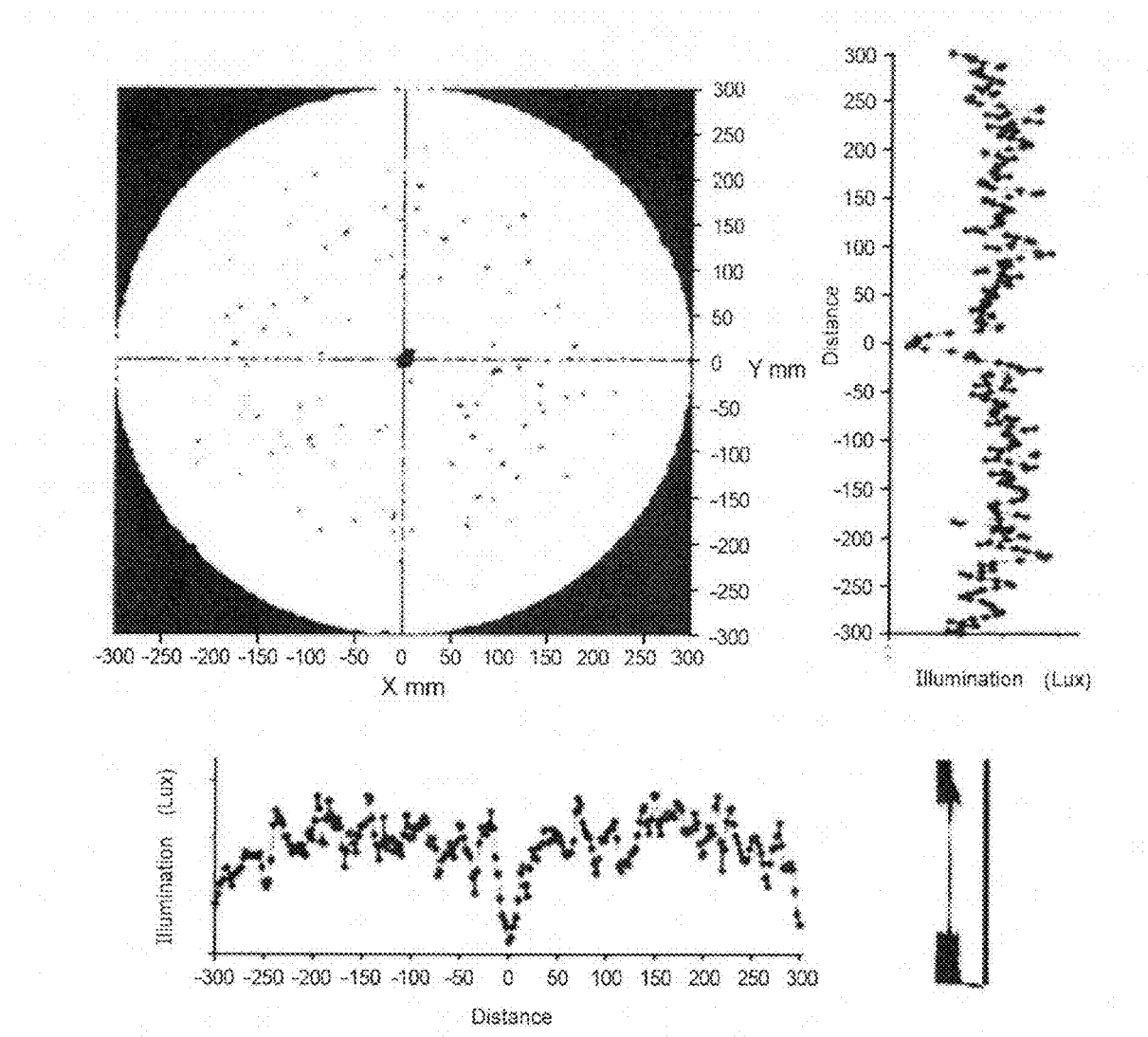
FIG. 7 is an example of a numeric calculation result according to the first embodiment.

On the other hand, according to this method, the illuminance distribution immediately is as illustrated in FIG. 7 (in this case, the diameter of the scatter dot, the number of scatter dots, and the pitch in the radial direction are the same as those of the case of FIG. 6). In FIG. 7, a color contour of illuminance distribution is illustrated at the upper left. The horizontal axis is x axis [mm], and the vertical axis is y axis [mm]. Theses axes are perpendicular to the rotation symmetric axis 110. In this case, the "maximum/minimum" of the illuminance distribution is about 3, which is about 1/12.3 times the previous case. This can be said to be sufficient uniformity ratio in accordance with JIS standard (JIS-Z9110).

It should be noted that the heat radiation unit 50 is the pillar, but in order to further improve the heat radiation characteristics, a disk may be provided at a part of the pillar. This can increase the size of heat radiation area, and the temperature of the entire body can be reduced. Alternatively, a heat pipe may be provided inside of the heat radiation unit 50, and the thermal transmission performance can be improved.

In addition, more hollow holes 20 may be provided in the light-guiding unit 10. This can generate natural convection through multiple hollow holes 20, and the heat radiation is further accelerated.

The scatter dots 90 are not limited to printing in white. Alternatively, a rough surface made by roughening the surface, or many concave portions may be provided on the back surface of the light-guiding unit 10.

When the light output surface 10a of the light-guiding unit 10 is further provided with transparent scatter pattern, the total luminous flux emitted from the light output surface 10a can be increased. For example, the same scatter pattern as the back surface may be employed as the transparent scatter pattern. However, for example, instead of white, transparent beads may be applied as the scatter dots. Accordingly, the light cast upon the scatter dots on the light output surface a is diffused and transmitted.

As can be understood from FIG. 4, even when there is no scatter pattern, a sufficient amount of light is emitted from the light output surface 10a. Therefore, no scatter pattern may also be acceptable.

When the coverage factor of the scatter pattern satisfies $\rho(r_E)=1$, the scatter pattern becomes condensational as compared with the case where $\rho(r_E)<1$. Therefore, more light is output from the light output surface 10a.

According to the illumination device 100 of the present embodiment, the light reaching the end portion 10f of the light-guiding unit 10 can be efficiently output from the light output surface 10a without degrading the transparentness (the second embodiment).

Figure 8:
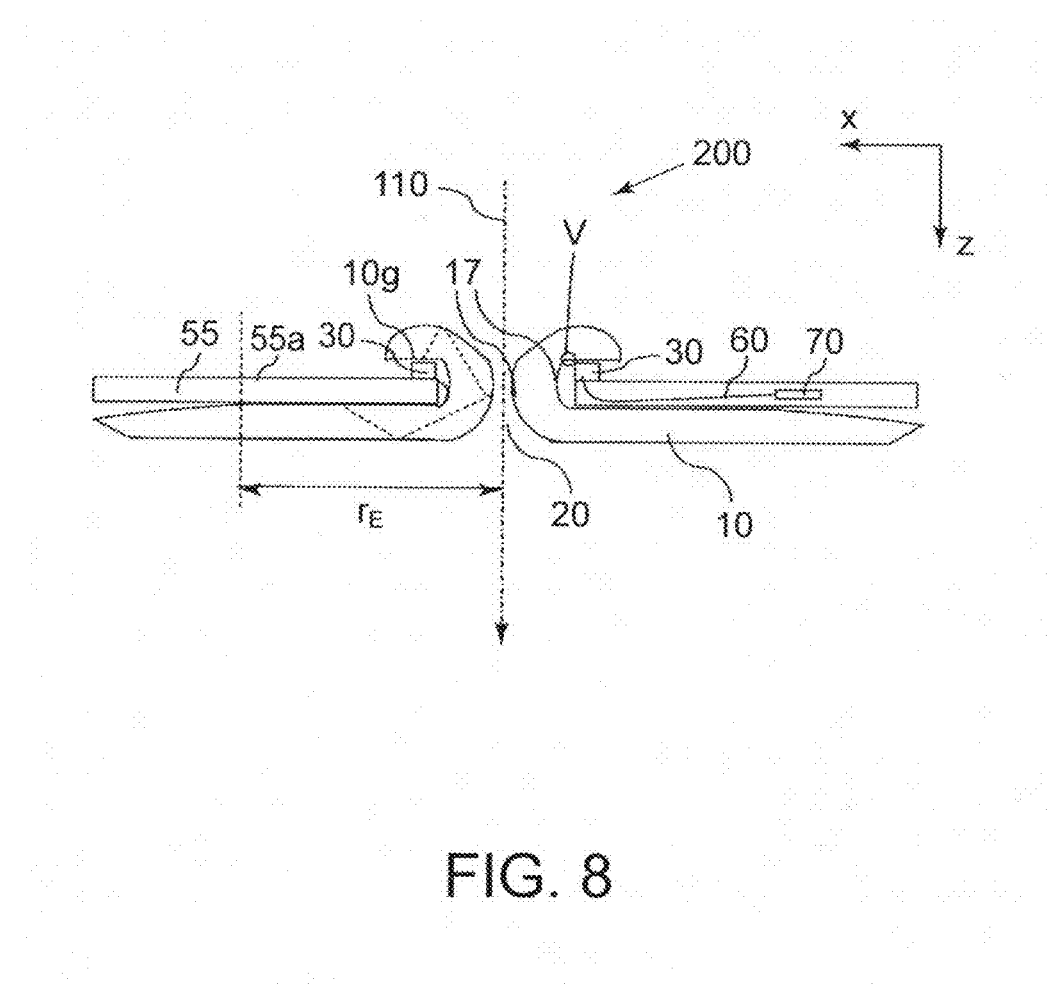
FIG. 8 is a figure illustrating an illumination device according to a second embodiment.

FIG. 8 is a figure illustrating of an illumination device 200 according to a second embodiment. In the explanation below, the features different from the illumination device 100 explained above will be mainly explained. The illumination device 200 has a heat radiation unit 55 which is made by integrating the joint unit 40 and the heat radiation unit 50.

In a region where the distance from the rotation symmetric axis 110 is within $r_E$, the light-guiding unit 10 is provided with a curved surface portion 17 on the light output surface 10a and the back surface 10b of the light-guiding unit 10 in such a manner that it is wound around to cover the end portion 55a of the heat radiation unit 55.

The light sources 30 are arranged so that the light emission surfaces face an end surface 10g of the light-guiding unit 10 which is close to the rotation symmetric axis 110. Now, a section of the light-guiding unit 10 is taken along the plane including the rotation symmetric axis 110. At this occasion, a point where the end surface 10g and the back surface 10b of the light-guiding unit 10 intersect each other is denoted as V. The curved surface portion 17 of the light-guiding unit 10 is configured to have such a shape that, any given point on the light output surface 10a in a finite region where the distance from the rotation symmetric axis 110 is equal to or more than $r_S$ and less than $r_E$ is denoted as W, and the angle formed by the inward (direction to the inside of the light-guiding unit 10) normal line of the light output surface 10a at the point W and the vector WV (a vector connecting the point W and the point V) is equal to or more than critical angle $\theta_c$.

The heat radiation unit 55 is in an annular shape, and is in a shape along the light-guiding unit 10. The material is, for example, glass. However, the heat radiation unit 55 is not limited thereto, and it may be transparent ceramics. Alternatively, it may be metal such as aluminum painted in white. The light source 30 is configured such that the light source 30 is placed on the upper surface (negative side in the z axis) 55a of the heat radiation unit 55.

According to the illumination device 200 of the present embodiment, the light emitted by the light source 30 is substantially totally reflected by the light output surface 10a of the curved surface portion 17 of the light-guiding unit 10, and is propagated through the light-guiding unit 10. The component of the light that is not totally reflected by the curved surface portion 17 is output to the outside through the light output surface 10a of the light-guiding unit 10. Accordingly, the ceiling side can also be illuminated. At this occasion, the thermal transmitted from the light source 30 to the heat radiation unit 55 is directly radiated to the outside. Alternatively, it is transmitted through the light-guiding unit 10, and is radiated to the outside from the light-guiding unit 10.

(Third Embodiment)

Figure 9:
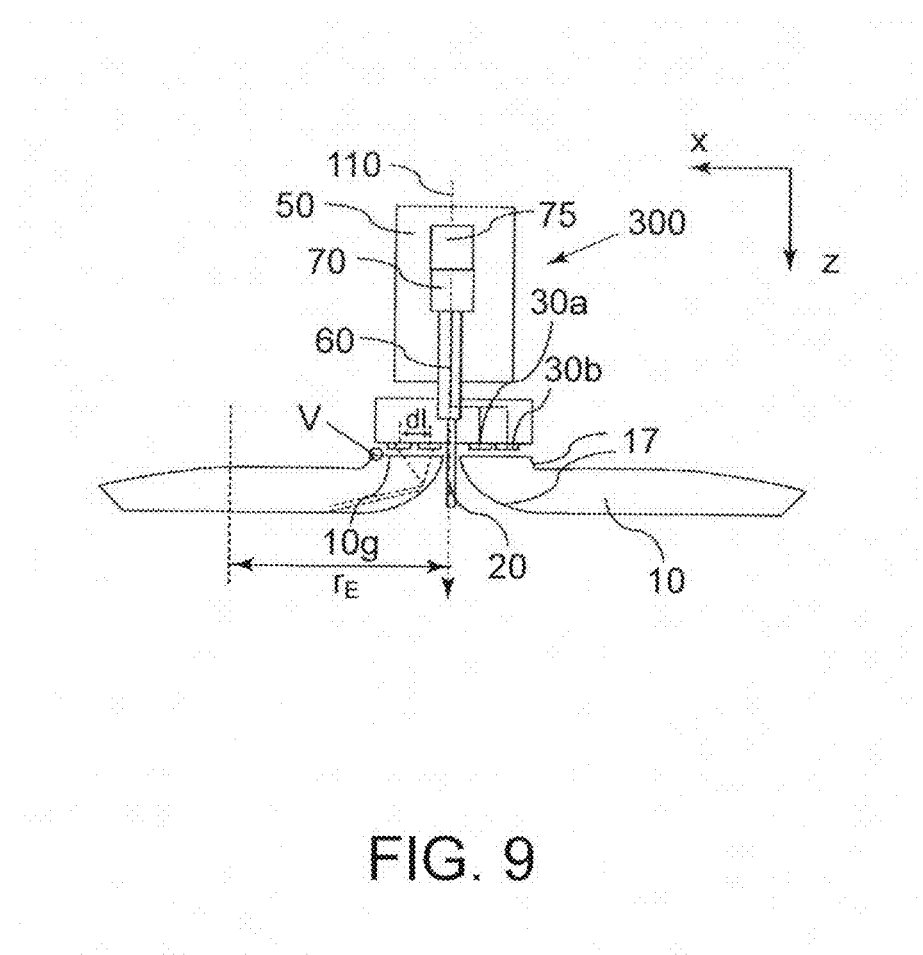
FIG. 9 is a figure illustrating an illumination device according to a third embodiment.

FIG. 9 is a figure illustrating an illumination device 300 according to a third embodiment. In the explanation below, the features different from the illumination device 100 explained above will be mainly explained.

In a region where the distance from the rotation symmetric axis 110 is within $r_E$, the light-guiding unit 10 is provided with the curved surface portion 17 on the light output surface 10a and the back surface 10b of the light-guiding unit 10.

The light sources 30 are arranged so that the light emission surfaces face the end surface 10g of the light-guiding unit 10 which is close to the rotation symmetric axis 110. Now, a section of the light-guiding unit 10 is taken along the plane including the rotation symmetric axis 110. At this occasion, a point where the end surface 10g and the back surface 10b of the light-guiding unit 10 intersect each other is denoted as V. The curved surface portion 17 of the light-guiding unit 10 is configured to have such a shape that, any given point on the light output surface 10a in a finite region where the distance from the rotation symmetric axis 110 is equal to or more than $r_S$ and less than $r_E$ is denoted as W, and the angle formed by the inward (direction to the inside of the light-guiding unit 10) normal line of the light output surface 10a at the point W and the vector WV (a vector connecting the point W and the point V) is equal to or more than critical angle $\theta_c$.

Two types of light sources 30a and 30b are provided on the joint unit 40. The light sources 30a and 30b each have different wavelength spectrums, and are spaced apart by the distance d1 in the radial direction from the rotation symmetric axis 110.

According to the illumination device 300 of the present embodiment, the colors in different colors emitted from the light source 30a and the light source 30b are mixed at the curved surface portion 17 of the light-guiding unit 10, and become a light having a substantially uniform color and output from the light output surface 10a. A control unit 75 for individually controlling ON/OFF state and intensity of the light sources 30a and 30b controls the optical intensity of the light source 30a and the light source 30b, whereby the light output from the light output surface 10a can be adjusted.

The illumination device 300 of FIG. 9 is provided with a penetration hole through the curved surface portion 17 of the light-guiding unit 10, so that the light is diffused, and the colors are further mixed. Air passes through the penetration hole, and therefore, there is an effect of cooling the heat of the heat radiation unit 50.

According to an illumination device or a light-guiding member according to at least one of the embodiments explained above, the light reaching the end portion of the light-guiding plate (light-guiding unit) can be efficiently output from the light output surface without deteriorating the transparentness.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising a point light source and a light-guiding unit,
   wherein the light-guiding unit is disc-shaped and is rotationally symmetrical about an axis, and the point light source is disposed in a central portion the light-guiding unit,
   wherein the light-guiding unit has a light output surface, a back surface, a curved surface, and a rough surface that is angled relative to the axis,
   wherein the back surface has a first position that is away by a first distance from the axis,
   wherein the light output surface has a second position that is away by a second distance from the axis,
   wherein the curved surface is disposed at an outer periphery of the back surface,
   wherein an intersection of the axis and the back surface is an origin point, a direction of the axis from the back surface to the light output surface is positive, a normal line of the curved surface intersects with the axis at a positive side of the axis, and an angle formed by a normal line vector in a direction toward the light output surface from the back surface and a vector in a direction from the curved surface to the second position is equal to or more than a critical angle,
   wherein the rough surface is in a region of the light output surface farther than the second position on the light output surface, and light that is totally reflected off the curved surface is diffused and transmitted through the rough surface,
   wherein light sources are arranged with a regular interval in a ring shape manner, and
   wherein the light-guiding unit comprises:
   a rough end surface connecting with the back surface in a region of the light output surface farther than the second position, and a normal line of the end surface and a normal line of the back surface intersect each other at a negative side of the axis, and
   scatter dots provided on the back surface in order to scatter guided light, a distribution of the scatter dots being rarefactional when the scatter dots are closer to the axis and condensational when the scatter dots are farther from the axis
   wherein the back surface comprises a flat surface portion extending from a third position on the back surface to the first position; and wherein the light output surface comprises a flat surface portion extending from a fourth position on the light output surface to the second position, and wherein the flat surface portion of the light output surface is substantially parallel to the flat surface portion of the back surface.

2. The illumination device according to claim 1, wherein the light-guiding unit has a hollow hole whose center is at the axis, and
   the light source is arranged in the hollow hole, and emits the light toward a side surface of the hollow hole.

3. The illumination device according to claim 1,
   wherein the scatter dots of the light-guiding unit form scatter units for scattering incident light, and
   wherein a coverage factor ρ(r) of the scatter units at a distance r from the axis satisfies a following expression, $$\rho(r) = \alpha \frac{r}{\beta - r^2}$$

where the first distance is denoted as $r_E$, α is a positive real number, and β is a real number satisfying $\beta \geq \alpha r_E + r_E^2$.

4. The illumination device according to claim 3, wherein the coverage factor ρ(r) of the scatter units at the distance r from the axis satisfies a following expression, $$\rho(r) = \rho(r_S) \frac{C}{2r_S} \frac{2r}{C + r_S^2 - r^2}$$

where the first distance is denoted as $r_E$, and a distance from the axis to a side surface of a hollow hole of the light-guiding unit is denoted as $r_s$,
and $\rho(r_s)$ satisfies $$\rho(r_s) \leq \frac{r_S}{r_E}$$

and C is a constant that satisfies $$C \geq \frac{r_S}{r_S - r_E \rho(r_S)}(r_E^2 - r_S^2).$$

5. The illumination device according to claim 4, wherein the scatter units are in a circular shape having a diameter D, and where a pitch $P_1$ of a radial direction of the scatter units is constant, a pitch $P_2$ (r) in an azimuth direction of the scatter units at the distance r from the axis satisfies a following expression, $$P_2(r) = P_2(r_S) \frac{2r_S}{C} \frac{C + r_S^2 - r^2}{2r}$$

where $P_2(r_s)$ satisfies $$D = \frac{r_E}{r_S} \leq P_2(r_S) \leq 2\pi r_S$$

and
C is a constant that satisfies $$C \geq \frac{r_S P_2(r_S)}{r_S P_2(r_S) - r_E D}(r_E^2 - r_S^2).$$

6. The illumination device according to claim 2, comprising a heat radiation unit, wherein
a joint unit is connected to the heat radiation unit, and the light source is provided on the joint unit, and the joint unit is provided in the hollow hole, and
the joint unit is partially provided with a threading processed portion, and the light-guiding unit is fixed, in a sandwiched manner, by a plurality of nuts corresponding to the threading processed portion.

7. The illumination device according to claim 1, wherein the light-guiding unit has a curved surface portion in a region of the back surface closer to the axis than the first position and in a region of the light output surface closer to the axis than the second position, and has an incidence surface, which connects the back surface and the light output surface, in a region of the back surface closer to the axis than the first position and in a region of the light output surface closer to the axis than the second position, and
a plurality of light sources having different wavelength spectrums are provided, and the light sources emit light onto the incidence surface.

8. A light-guiding member comprising a light output surface, a curved surface, and a rough surface,
wherein the light-guiding member is disc-shaped and rotationally symmetrical about an axis, and the rough surface is angled relative to the axis,
wherein the back surface has a first position that is away by a first distance from the axis,
wherein the light output surface has a second position that is away by a second distance from the axis, wherein the curved surface is disposed at an outer periphery of the first position,
wherein an intersection of the axis and the back surface is an origin point, a direction of the axis from the back surface to the light output surface is positive, a normal line of the curved surface intersects with the axis at a positive side of the axis, and an angle formed by a normal line vector at the second position in a direction toward the light output surface from the back surface and a vector in a direction from the curved surface to the second position is equal to or more than a critical angle,
wherein the rough surface is in a region of the light output surface farther than the second position on the light output surface, and light that is totally reflected off the curved surface is diffused and transmitted through the rough surface,
wherein light sources are arranged with a regular interval in a ring shape manner so that an outward normal direction of a light emission surface is parallel to an outward normal direction of a light-incident surface, and
wherein the light-guiding member comprises:
a rough end surface connecting with the back surface in a region of the light output surface farther than the second position, and a normal line of the end surface and a normal line of the back surface intersect each other at a negative side of the axis, and
scatter dots provided on the back surface in order to scatter guided light, a distribution of the scatter dots being rarefactional when the scatter dots are closer to the axis and condensational when the scatter dots are farther from the axis
wherein the back surface comprises a flat surface portion extending from the light-incident surface to said first position; and wherein the light output surface comprises a flat surface portion extending from the light-incident surface to said second position, and wherein the flat surface portion of the back surface is substantially parallel to the flat surface portion of the light output surface.

9. The light-guiding member according to claim 8, wherein the light-guiding member is in a shape of rotation symmetric about the axis.

10. The light-guiding member according to claim 8, wherein
the light-guiding member has a hollow hole whose center is at the axis for accommodating a light source that is provided in the hollow hole, and emits light toward a side surface of the hollow hole.

11. The light-guiding member according to claim 8,
wherein the scatter dots of the light-guiding unit form scatter units for scattering incident light, and
wherein a coverage factor $\rho(r)$ of the scatter units at a distance r from the axis satisfies a following expression, $$\rho(r) = \alpha \frac{r}{\beta - r^2}$$

where the first distance is denoted as $r_E$, α is a positive real number, and β is a real number satisfying $β ≥ αr_E + r_E^2$.

12. The light-guiding member according to claim 11, wherein the coverage factor ρ(r) of the scatter units at the distance r from the axis satisfies a following expression, $$\rho(r) = \rho(r_S)\frac{C}{2r_S}\frac{2r}{C+r_S^2-r^2}$$

where the first distance is denoted as $r_E$, and a distance from the axis to a side surface of a hollow hole of the light-guiding member is denoted as $r_s$, and $\rho(r_s)$ satisfies $$\rho(r_S) \le \frac{r_S}{r_E}$$

and C is a constant that satisfies $$C \ge \frac{r_S}{r_S - r_E\rho(r_S)}(r_E^2 - r_S^2).$$

13. The light-guiding member according to claim 12, wherein the scatter units are in a circular shape having a diameter D, and where a pitch $P_1$ of a radial direction of the scatter units is constant, a pitch $P_2$ (r) in an azimuth direction of the scatter units at the distance r from the axis satisfies a following expression, $$P_2(r) = P_2(r_S)\frac{2r_S}{C}\frac{C+r_S^2-r^2}{2r}$$

where $P_2(r_s)$ satisfies $$D = \frac{r_E}{r_S} \le P_2(r_S) \le 2\pi r_S$$

and
C is a constant that satisfies $$C \ge \frac{r_S P_2(r_S)}{r_S P_2(r_S) - r_E D}(r_E^2 - r_S^2).$$

14. The light-guiding member according to claim 10, comprising a heat radiation unit, wherein
a joint unit is connected to the heat radiation unit, and the light source is provided on the joint unit, and the joint unit is provided in the hollow hole, and
the joint unit is partially provided with a threading processed portion, and the light-guiding member is fixed, in a sandwiched manner, by a plurality of nuts corresponding to the threading processed portion.

15. The illumination device according to claim 1, wherein an exit surface is partially rough.

16. The illumination device according to claim 1, wherein the rough surface is formed such that the light further comes into contact with the light output surface of the light-guiding unit, and the light is transmitted outside without being totally reflected.

17. An illumination device comprising a point light source and a light-guiding unit,
wherein the light-guiding unit is disc-shaped and is rotationally symmetrical about an axis, and the point light source is disposed in a central portion the light-guiding unit,
wherein the light-guiding unit has a light output surface, a back surface, and a curved surface,
wherein the back surface has a first position that is away by a first distance from the axis,
wherein the light output surface has a second position that is away by a second distance from the axis,
wherein the curved surface is at an outer periphery of the back surface,
wherein an intersection of the axis and the back surface is an origin point, a direction of the axis from the back surface to the light output surface is positive, a normal line of the curved surface intersects with the axis at a positive side of the axis, and an angle formed by a normal line vector of the light output surface at the second position in a direction toward the light output surface from the back surface and a vector in a direction from the curved surface to the second position is equal to or more than a critical angle,
wherein a light that is totally reflected off the curved surface comes into the light output surface at an angle less than the critical angle,
wherein light sources are arranged with a regular interval in a ring shape manner so that an outward normal direction of a light emission surface is parallel to an outward normal direction of a light-incident surface, and
wherein the light-guiding unit comprises:
a rough end surface connecting with the back surface in a region of the light output surface farther than the second position, and a normal line of the end surface and a normal line of the back surface intersect each other at a negative side of the axis, and
scatter dots provided on the back surface in order to scatter guided light, a distribution of the scatter dots being rarefactional when the scatter dots are closer to the axis and condensational when the scatter dots are farther from the axis
wherein the back surface comprises a flat surface portion extending from the light-incident surface to said first position; and wherein the light output surface comprises a flat surface portion extending from the light-incident surface to said second position, and wherein the flat surface portion of the back surface is substantially parallel to the flat surface portion of the light output surface.

18. An illumination device comprising a point light source and a light-guiding unit,
wherein the light-guiding unit is disc-shaped and is rotationally symmetrical about an axis, and the point light source is disposed in a central portion the light-guiding unit,
wherein the light-guiding unit has a light output surface, a back surface, a curved surface, and a rough surface that is angled relative to the axis,
wherein the back surface has a first position that is away by a first distance from the axis,
wherein the light output surface has a second position that is away by a second distance from the axis, wherein the curved surface is in a region of the back surface farther from the axis than the first position, wherein an intersection of the axis and the back surface is an origin point, a direction of the axis from the back surface to the light output surface is positive, a normal line of the curved surface intersects with the axis at a positive side of the axis, and an angle formed by a normal line vector at the second position in a direction toward the light output surface from the back surface and a vector in a direction from the curved surface to the second position is equal to or more than a critical angle, wherein the rough surface is in a region of the light output surface farther than the second position on the light output surface, and light that is totally reflected off the curved surface is diffused and transmitted through the rough surface, wherein light sources are arranged with a regular interval in a ring shape manner so that an outward normal direction of a light emission surface is parallel to an outward normal direction of a light-incident surface, and wherein the light-guiding unit comprises:

a rough end surface connecting with the back surface in a region of the light output surface farther than the second position, and a normal line of the end surface and a normal line of the back surface intersect each other at a negative side of the axis, and scatter dots provided on the back surface in order to scatter guided light, a distribution of the scatter dots being rarefactional when the scatter dots are closer to the axis and condensational when the scatter dots are farther from the axis wherein the back surface comprises a flat surface portion extending from the light-incident surface to said first position; and wherein the light output surface comprises a flat surface portion extending from the light-incident surface to said second position, and wherein the flat surface portion of the back surface is substantially parallel to the flat surface portion of the light output surface.

19. A light-guiding member comprising a light output surface, a back surface, a rotationally symmetric shape, and a curved surface, wherein the light-guiding member is disc-shaped and is rotationally symmetrical about an axis, wherein the back surface has a first position that is away by a first distance from the axis, wherein the light output surface has a second position that is away by a second distance from the axis, wherein the curved surface is disposed at an outer periphery of the back surface, wherein an intersection of the axis and the back surface is an origin point, a direction of the axis from the back surface to the light output surface is positive, a normal line of the curved surface intersects with the axis at a positive side of the axis, and an angle formed by a normal line vector at the second position in a direction toward the light output surface from the back surface and a vector in a direction from the curved surface to the second position is equal to or more than a critical angle, wherein a light that is totally reflected off the curved surface comes into the light output surface at an angle less than the critical angle, wherein light sources are arranged with a regular interval in a ring shape manner so that an outward normal direction of a light emission surface is parallel to an outward normal direction of a light-incident surface, and wherein the light-guiding member comprises:

a rough end surface connecting with the back surface in a region of the light output surface farther than the second position, and a normal line of the end surface and a normal line of the back surface intersect each other at a negative side of the axis, and scatter dots provided on the back surface in order to scatter guided light, a distribution of the scatter dots being rarefactional when the scatter dots are closer to the axis and condensational when the scatter dots are farther from the axis wherein the back surface comprises a flat surface portion extending from the light-incident surface to said first position; and wherein the light output surface comprises a flat surface portion extending from the light-incident surface to said second position, and wherein the flat surface portion of the back surface is substantially parallel to the flat surface portion of the light output surface.

20. A light-guiding member comprising a light output surface, a back surface, a curved surface, and a rough surface, wherein the light-guiding member is disc-shaped and is rotationally symmetrical about an axis, and the rough surface is angled relative to the axis, wherein the back surface has a first position that is away by a first distance from the axis, wherein the light output surface has a second position that is away by a second distance from the axis, wherein the curved surface is disposed at an outer periphery of the back surface, wherein an intersection of the axis and the back surface is an origin point, a direction of the axis from the back surface to the light output surface is positive, a normal line of the curved surface intersects with the axis at a positive side of the axis, and an angle formed by a normal line vector at the second position in a direction toward the light output surface from the back surface and a vector in a direction from the curved surface to the second position is equal to or more than a critical angle, wherein the rough surface is in a region of the light output surface farther than the second position on the light output surface, and light that is totally reflected off the curved surface is diffused and transmitted through the rough surface, wherein light sources are arranged with a regular interval in a ring shape manner so that an outward normal direction of a light emission surface is parallel to an outward normal direction of a light-incident surface, and wherein the light-guiding member comprises:

a rough end surface connecting with the back surface in a region of the light output surface farther than the second position, and a normal line of the end surface and a normal line of the back surface intersect each other at a negative side of the axis, and scatter dots provided on the back surface in order to scatter guided light, a distribution of the scatter dots being rarefactional when the scatter dots are closer to the axis and condensational when the scatter dots are farther from the axis wherein the back surface comprises a flat surface portion extending from the light-incident surface to said first position; and wherein the light output surface comprises a flat surface portion extending from the light-incident surface to said second position, and wherein the flat surface portion of the back surface is substantially parallel to the flat surface portion of the light output surface.

\* \* \* \* \*